(12) United States Patent
Wu et al.

(10) Patent No.: US 12,022,332 B2
(45) Date of Patent: Jun. 25, 2024

(54) METHOD AND APPARATUS FOR PERFORMING OPERATIONS RELATING TO SELF ORGANISED NETWORKS

(71) Applicant: Samsung Electronics Co., Ltd., Suwon-si (KR)

(72) Inventors: Shangbin Wu, Chertsey (GB); Joan Pujol Roig, Chertsey (GB); Deepanshu Gautam, Chertsey (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 43 days.

(21) Appl. No.: 17/453,108

(22) Filed: Nov. 1, 2021

(65) Prior Publication Data
US 2022/0141726 A1    May 5, 2022

(30) Foreign Application Priority Data

Oct. 30, 2020 (IN) .............................. 202031047400
Oct. 18, 2021 (GB) ..................................... 2114872

(51) Int. Cl.
*H04W 36/00* (2009.01)
*H04W 36/04* (2009.01)

(52) U.S. Cl.
CPC ....... *H04W 36/0058* (2018.08); *H04W 36/04* (2013.01)

(58) Field of Classification Search
CPC ............. H04W 36/0058; H04W 36/04; H04W 36/0085; H04W 36/008375; H04W 36/22; H04W 36/24; H04W 36/0061; H04W 24/10; H04W 8/22; H04W 8/24; H04W 28/095; H04W 84/18; H04W 24/02; H04W 24/08; H04W 36/00837

See application file for complete search history.

(56) References Cited

U.S. PATENT DOCUMENTS

| | | | |
|---|---|---|---|
| 8,774,823 B2 | 7/2014 | Golaup et al. | |
| 2005/0239465 A1* | 10/2005 | Lee | H04W 36/26 455/442 |
| 2011/0211560 A1* | 9/2011 | Yamamoto | H04W 36/00837 370/332 |
| 2011/0317578 A1* | 12/2011 | Tomita | H04W 36/02 370/252 |

(Continued)

FOREIGN PATENT DOCUMENTS

| | | |
|---|---|---|
| WO | 2019032968 A1 | 2/2019 |
| WO | 2020163991 A1 | 8/2020 |

OTHER PUBLICATIONS

United Kingdom Intellectual Property Office, "Combined Search and Examination Report under Sections 17 and 18(3)," dated Jul. 1, 2022, in connection with United Kingdom Patent Application No. GB2114872. 1, 7 pages.

(Continued)

*Primary Examiner* — Kan Yuen (57) ABSTRACT

Disclosed is a method of operating a telecommunication network comprising the steps of: a User Equipment, UE, collecting information related to a load that it imposes on a visited cell, wherein the load comprises a radio resource load and a virtual resource load; the UE reporting the information to a serving cell, in response to a request for the information.

10 Claims, 7 Drawing Sheets

(56) References Cited

U.S. PATENT DOCUMENTS

| | | | |
|---|---|---|---|
| 2012/0008512 A1* | 1/2012 | Wahlqvist | H04W 52/0232 |
| | | | 370/252 |
| 2013/0310043 A1* | 11/2013 | Bakker | H04W 36/22 |
| | | | 455/436 |
| 2014/0242916 A1* | 8/2014 | Bellamkonda | H04L 47/11 |
| | | | 455/67.11 |
| 2015/0208280 A1* | 7/2015 | Lorca Hernando | H04W 16/08 |
| | | | 370/235 |
| 2016/0112896 A1* | 4/2016 | Karampatsis | H04L 47/32 |
| | | | 370/230.1 |
| 2016/0119856 A1* | 4/2016 | Hwang | H04W 48/12 |
| | | | 370/328 |
| 2016/0234693 A1* | 8/2016 | Yi | H04W 16/08 |
| 2017/0094566 A1* | 3/2017 | Yang | H04W 36/0085 |
| 2017/0208526 A1* | 7/2017 | Madan | H04W 36/00837 |
| 2017/0215224 A1* | 7/2017 | Ke | H04W 76/32 |
| 2018/0270688 A1 | 9/2018 | Jung et al. | |
| 2019/0394655 A1 | 12/2019 | Rahman et al. | |
| 2020/0045601 A1* | 2/2020 | Pedersen | H04W 36/08 |
| 2020/0089589 A1 | 3/2020 | Chou et al. | |
| 2020/0178145 A1* | 6/2020 | Han | H04W 24/10 |

OTHER PUBLICATIONS

Samsung, "HO Optimization based on UE Load" 3GPP TSG-SA5 Meeting #132e S5-206380, Online, Nov. 16-Nov. 25, 2020, 2 pages.
3GPP TR 28.809 V1.0.0 (Sep. 2020) Technical Report; 3rd Generation Partnership Project; Technical Specification Group Services and System Aspects; Management and orchestration; Study on enhancement of Management Data Analytics (MDA) (Release 17), 75 pages.
3GPP TR 28.809 V1.2.0 (Feb. 2021) Technical Report; 3rd Generation Partnership Project; Technical Specification Group Services and System Aspects; Management and orchestration; Study on enhancement of Management Data Analytics (MDA) (Release 17), 95 pages.
International Search Report and Written Opinion of the International Searching Authority in connection with International Application No. PCT/KR2021/015347 dated Feb. 10, 2022, 9 pages.
Supplementary European Search Report dated Mar. 14, 2024, in connection with European Patent Application No. 21886866.9, 15 pages.

* cited by examiner

FIG. 1

Prior Art

```
TargetCellIds ::= {CellA, CellB, CellC, ···, CellN}
Timestamp ::= INTEGER
MaxNumOfCells ::= INTEGER(1..N)
```

| Cell ID | DL Load (%) | UL Load (%) | RecordingTime |
|---------|-------------|-------------|---------------|
| Cell A  | 37          | 25          | 3631          |
| Cell B  | 0           | 12          | 34            |
| Cell C  | 7           | 32          | 6135          |
| Cell D  | 45          | 7           | 8964          |
| ...     |             |             |               |

```
VisitedCellIds ::= {CellA, CellB, CellC, ···, CellK}
RecordingTime ::= {RTA,RTB,RTC, ···, RTK}
DLLoad ::= {DLLA,DLLB,DLLC, ···, DLLK}
ULLoad ::= {ULLA,ULLB,ULLC, ···, ULLK}
```

METHOD AND APPARATUS FOR PERFORMING OPERATIONS RELATING TO SELF ORGANISED NETWORKS

CROSS-REFERENCE TO RELATED APPLICATIONS

The application is based on and claims priority under 35 U.S.C. § 119(a) of an Indian patent application number 202031047400, filed on Oct. 30, 2020, and a Great Britain patent application number 2114872.1, filed on Oct. 18, 2021. The disclosures of which are incorporated by reference herein in their entirety.

BACKGROUND

1. Field

The present disclosure relates to Self-Organised Networks (SONs) and, in particular, to their use in a telecommunication network. It relates particularly, but not exclusively, to Fifth Generation (5G) networks, although other types of telecommunication network can benefit from embodiments of the disclosure.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

Recent enhancements in 3GPP self-organized network (SON) such as energy saving (ES), mobility load balancing (MLB), and random access channel (RACH) require further assistance from user equipments (UEs). In 3GPP NR Release 16, for instance, UEs gather statistics on the distribution of a number of RACH preambles per cell and distribution of RACH access delay.

Additionally, a target node, eNB, may not have adequate resources to accept certain handover requests. In the context of network virtualization, these resources may include not only legacy radio resources, but also virtual resources such as processor (CPU) and memory. Therefore, the current reference signal received power (RSRP) based handover framework is typically not sufficient to support future network deployments.

Figure 1:
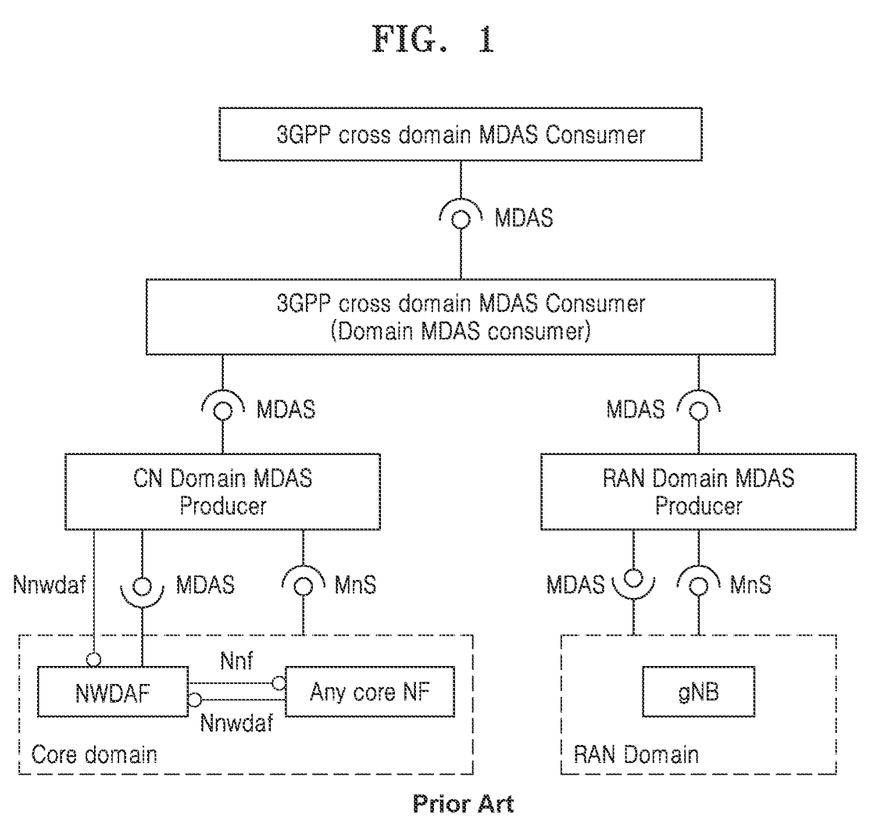
FIG. 1 shows a representation of interactions between MDAS and CORE domains in a RAN, as known in the prior art.

3GPP has proposed a Management Data Analytics (MDA) module which provides analysis on network data such as performance measurement, Quality of Experience (QoE) reports and network analytical data. It is an aim of embodiments of the present disclosure to make enhanced usage of the MDA functionality to further improve SON performance. FIG. 1 shows an example of interaction between Management Data Analytics Service (MDAS) and CORE domain in a RAN domain, known in the prior art.

SUMMARY

It is an aim of embodiments of the disclosure to address issues in the prior art, whether mentioned herein or not.

According to a first aspect of the present disclosure, there is provided a method of operating a telecommunication network comprising the steps of: a User Equipment, UE, collecting information related to a load that it imposes on a visited cell, wherein the load comprises a radio resource load and a virtual resource load; the UE reporting the information to a serving cell, in response to a request for the information.

In an embodiment, the serving cell further forwards the information to a Management Data Analytics, MDA, module in the network, then makes a handover request to a target cell.

In an embodiment, the target cell requests a load analytic report from the MDA module and the MDA module responds with the report.

In an embodiment, the report is conveyed by means of a Minimisation of Drive Tests, MDT, mechanism.

In an embodiment, the report is further conveyed to a Trace Collection Entity, TCE, by a Radio Access Network which is in communication with the UE.

In an embodiment, the target cell decides to accept or reject the handover request on the basis of the UE load analytic report.

In an embodiment, the information related to the radio resource load comprises the number of assigned Physical Resource Blocks, PRB, in each transmission.

In an embodiment, the virtual resource load comprises one or more of virtual processor, CPU, usage and virtual memory usage.

In an embodiment, the information is associated with a time stamp.

In an embodiment, the decision to accept or reject the handover request comprises the target cell predicting resources required by the UE.

In an embodiment, the decision further comprises determining if the virtual resources may be scaled to meet the UE requirement.

According to a second aspect of the present disclosure, there is provided a User Equipment arranged to perform the method of the first aspect.

According to a third aspect of the present disclosure, there is provided a telecommunication network comprising entities arranged to perform the method of the first aspect.

According to the present disclosure there is provided an apparatus and method as set forth in the appended claims. Other features of the disclosure will be apparent from the dependent claims, and the description which follows.

According to the present disclosure UEs are arranged to report load information based on imposed load in previously visited cells to better aid SON ES and MLB decision-making.

In prior art SONs, cell load information can be exchanged. However, this is not sufficient to estimate the additional load a UE imposes when this UE is handed over to another cell. Embodiments of the present disclosure provide a solution.

Embodiments of the present disclosure relate to UE handover. In an AI-based ES feature, a cell (Cell A) may migrate its attached users to another cell (Cell B) in order to enter standby mode and reduce the network power consumption. The migrated users will impose additional load to the target Cell B. During the handover, if Cell A does not know the capability of Cell B or an estimate of the load increase to be imposed in Cell B due to Cell A users, then Cell B may be overloaded by these additional users.

Similarly, in the case of a centralized Operation and Maintenance (O&M) or Management and Orchestration (MANO) function, managing and orchestrating the network cells, this managing function needs to know the capabilities of the current active cells such that it can estimate the loads, power consumptions, and other key performance indicators (KPIs) to take management decisions accordingly.

UE load estimation can mitigate the ping-pong effect, which can occur when a cell migrates a user to another cell to balance loads. The migrated user can increase the load of the destination cell such that the initial load imbalance further increases. To compensate for that, this user might be handed over back to the original cell, creating the so called the ping-pong effect.

In the prior art MDA, a user load report is not included. In this case, user load prediction after handover is not available, resulting in suboptimal handover decisions or even cell overload.

According to the present disclosure, there is provided a procedure for information exchange between the UE and current serving cell, such that the current cell receives previously imposed UE loads on past cells. The serving cell requests the load information on cells that are also in the same SON. It will also set a timestamp to ensure that the load report from a UE is not out of date.

In addition, an enhanced procedure for handover is provided. The target cell is able to request the UE load analytical report (ULAR) from the MDA, such that the target cell can predict the load imposed by the UE and decide whether to accept or reject the handover request. Handover optimization can benefit from knowledge about the projected UE load on the target cell, including additional radio and virtual resources, The MDA is provided with a capability to provide an analytics report indicating the projected UE load with respect to virtual resource and radio resource on the target cell.

Although a few preferred embodiments of the present disclosure have been shown and described, it will be appreciated by those skilled in the art that various changes and modifications might be made without departing from the scope of the disclosure, as defined in the appended claims.

BRIEF DESCRIPTION OF THE DRAWINGS

For a better understanding of the disclosure, and to show how embodiments of the same may be carried into effect, reference will now be made, by way of example only, to the accompanying diagrammatic drawings in which.

DETAILED DESCRIPTION

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While describing the embodiments, technical content that is well known in the related fields and not directly related to the disclosure will not be provided. By omitting redundant descriptions, the essence of the disclosure will not be obscured and may be clearly explained.

For the same reasons, components may be exaggerated, omitted, or schematically illustrated in drawings for clarity. Also, the size of each component does not completely reflect the actual size. In the drawings, like reference numerals denote like elements.

As used herein, the term "and/or" includes any and all combinations of one or more of the associated listed items. Expressions such as "at least one of," when preceding a list of elements, modify the entire list of elements and do not modify the individual elements of the list. Throughout the disclosure, the expression "at least one of a, b or c" indicates only a, only b, only c, both a and b, both a and c, both b and c, all of a, b, and c, or variations thereof.

Advantages and features of one or more embodiments of the disclosure and methods of accomplishing the same may be understood more readily by reference to the following detailed description of the embodiments and the accompanying drawings. In this regard, the present embodiments may have different forms and should not be construed as being limited to the descriptions set forth herein. Rather, these embodiments are provided so that this disclosure will be thorough and complete and will fully convey the concept of the present embodiments to one of ordinary skill in the art, and the disclosure will only be defined by the appended claims.

Here, it will be understood that combinations of blocks in flowcharts or process flow diagrams may be performed by computer program instructions. Since these computer program instructions may be loaded into a processor of a general purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated consecutively may actually be executed substantially concurrently, or the blocks may sometimes be performed in a reverse order according to the corresponding function.

Here, the term "unit" in the embodiments of the disclosure means a software component or hardware component such as a field-programmable gate array (FPGA) or an application-specific integrated circuit (ASIC) and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with a smaller number of components and "units", or may be divided into additional components and "units". Furthermore, the components and "units" may be embodied to reproduce one or more central processing units (CPUs) in a device or security multimedia card. Also, in the embodiments, the "unit" may include at least one processor. In the disclosure, a controller may also be referred to as a processor.

A wireless communication system has evolved from providing initial voice-oriented services to, for example, a broadband wireless communication system providing a high-speed and high-quality packet data service, such as communication standards of high speed packet access (HSPA), long-term evolution (LTE) or evolved universal terrestrial radio access (E-UTRA), and LTE-Advanced (LTE-A) of 3GPP, high rate packet data (HRPD) and ultra mobile broadband (UMB) of 3GPP2, and IEEE 802.16e. A 5th generation (5G) or new radio (NR) communication standards are being developed with 5G wireless communication systems.

Hereinafter, one or more embodiments will be described with reference to accompanying drawings. Also, in the description of the disclosure, certain detailed explanations of related functions or configurations are omitted when it is deemed that they may unnecessarily obscure the essence of the disclosure. All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies, and thus, the terms used herein have to be defined based on the meaning of the terms together with the description throughout the specification. Hereinafter, a base station may be a subject performing resource assignment of a terminal, and may be at least one of a gNode B, an eNode B, a Node B, a base station (BS), a wireless access unit, a base station controller, and a node on a network. A terminal may include user equipment (UE), a mobile station (MS), a cellular phone, a smart phone, a computer, a multimedia system capable of performing communication functions, or the like. In the disclosure, a DL is a wireless transmission path of a signal transmitted from a base station to a terminal, and a UL is a wireless transmission path of a signal transmitted from a terminal to a base station. Throughout the specification, a layer (or a layer apparatus) may also be referred to as an entity. Also, hereinbelow, one or more embodiments of the disclosure will be described as an example of an LTE or LTE-A system, but the one or more embodiments may also be applied to other communication systems having a similar technical background or channel form. For example, 5G mobile communication technology (5G, new radio, NR) developed after LTE-A may be included. In addition, the one or more embodiments may be applied to other communication systems through some modifications within the scope of the disclosure without departing from the scope of the disclosure according to a person skilled in the art.

In an LTE system as a representative example of the broadband wireless communication system, an orthogonal frequency division multiplexing (OFDM) scheme is used in a DL and a single carrier frequency division multiplexing (SC-FDMA) scheme is used in a UL. The UL refers to a wireless link through which a terminal, UE, or a MS transmits data or control signals to a BS or a gNode B, and the DL refers to a wireless link through which a BS transmits data or control signals to a terminal. In such a multiple access scheme, data or control information of each user is classified by generally assigning and operating the data or control information such that time-frequency resources for transmitting data or control information for each user do not overlap each other, that is, such that orthogonality is established.

Terms such as a physical channel and a signal in an existing LTE or LTE-A system may be used to describe methods and apparatuses suggested in the disclosure. However, the content of the disclosure is applied to a wireless communication system, instead of the LTE or LTE-A system.

Figure 2:
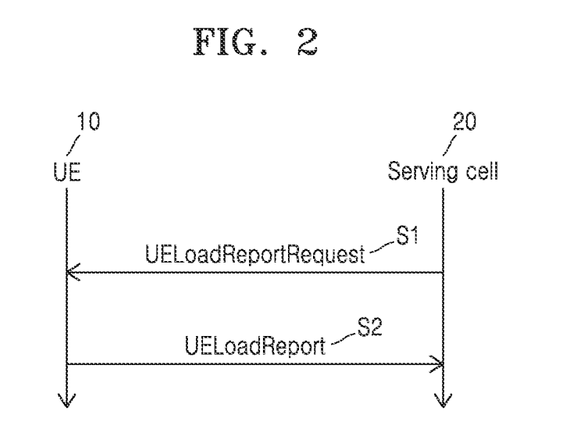
FIG. 2 shows a message exchange according to an embodiment of the present disclosure.

FIG. 2 illustrates a first embodiment. Here, the serving cell 20 initiates a procedure by sending a message S1 to a UE 10 requesting the UE load report. This message is sent via RRC signalling. The UE load report records the UE statistical loads imposed on cells that the UE has previously visited. In response, the UE 10 will send the UE load report S2 to the serving cell 20.

Figure 3:
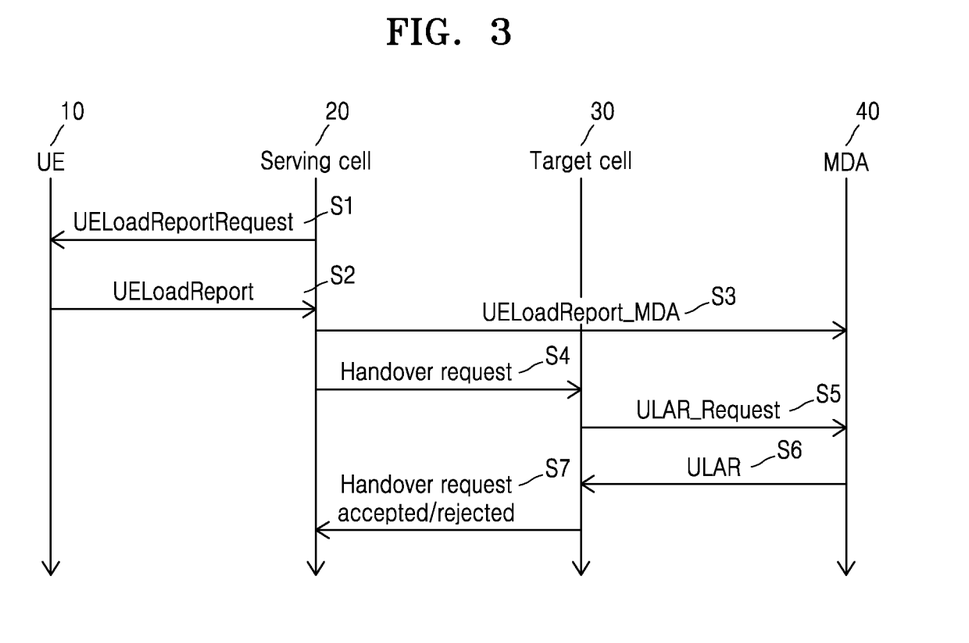
FIG. 3 shows a message exchange according to an embodiment of the present disclosure.

FIG. 3 shows an enhanced handover procedure based on the UE load report from MDA. FIG. 3 builds on FIG. 2 and shows the steps subsequent to those shown there.

The serving cell 20 sends a message S1 UELoadReportRequest to a UE 10. After the serving cell obtains the UE load report, via message S2, the serving cell 20 forwards the report to the MDA 40, in message S3. When handover is needed for the UE, as a result of handover request S4, the target cell 30 sends a message S4 to the MDA 40 requesting the UE load analytical report (ULAR), S5. The target cell 30 decide whether the handover request is accepted or rejected based on the ULAR, received via message S6 from the MDA 40, and signals the result to the serving cell 20 via message S7.

A UE load report request S1 is sent from the current serving cell 20 to the UE 10 via a RRC message. In the request, the current serving cell indicates the IDs of cells the current serving cell 20 wants to collect information on, the maximum number of cell load statistics to be reported, and a time stamp. The UE 10 puts load statistics on the requested cells no earlier than the time stamp.

Figure 4:
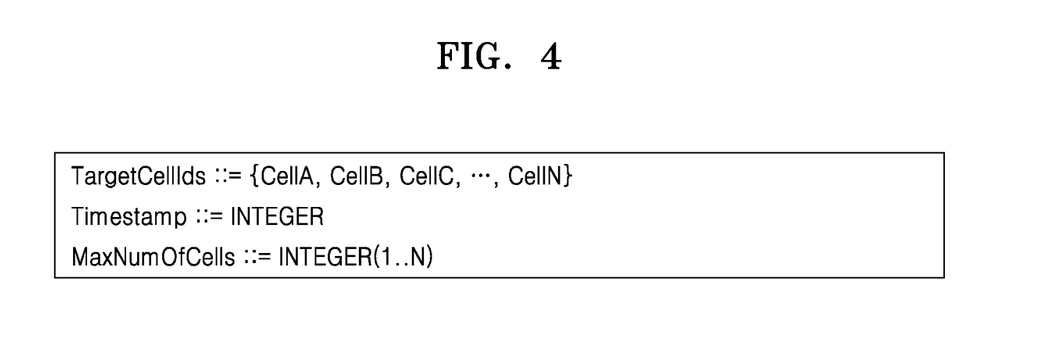
FIG. 4 shows an example RRC message according to an embodiment of the present disclosure.

An example of the UELoadReportRequest message S1 is shown in FIG. 4. The TargetCellIds is an integer vector informing the UE 10 which cell's load statistics should be reported. These target cells 30 can be the cells in the same SON as the serving cell 20. The Timestamp can be an integer, informing the UE 10 that it should only report load statistics collected no later than the time stamp. This prevents significantly outdated information collected by the UE from adversely affecting the decisions in the SON. The MaxNumofCells is an integer informing the UE 10 of the maximum number of cell load statistics it should report.

Figure 5:
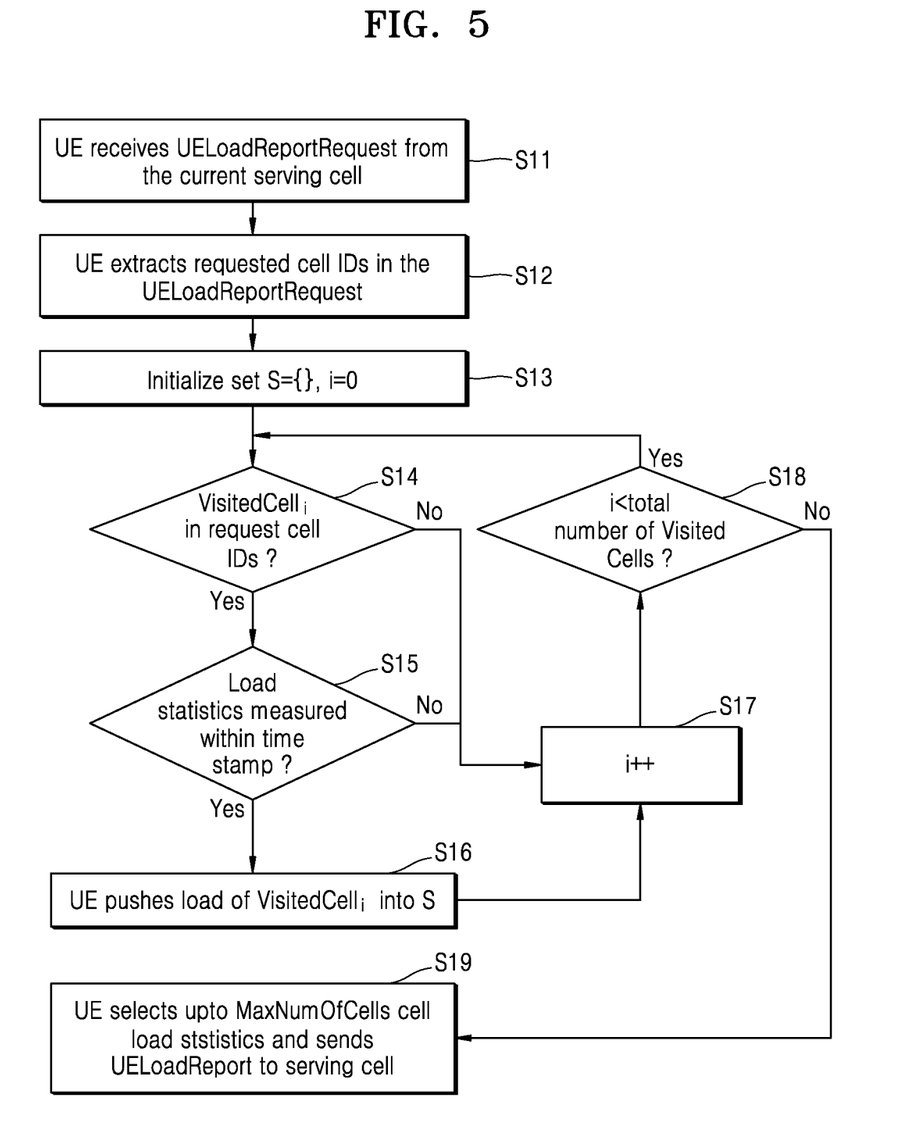
FIG. 5 shows a method according to an embodiment of the present disclosure.

The UE 10 maintains a list recording the cells it has visited in the past. This procedure is illustrated in FIG. 5.

After receiving the UELoadReportRequest, S11, from the current serving cell 20, the UE 10 reads the message to extract, S12, which cells are in the same SON as the serving cell 20, via the provided cell IDs, and initialises measurements, S13.

Next, the UE will check, S14, its local load history and assess whether a visited cell of its local history is in the list in the UELoadReportRequest. If so, then the UE will check, S15, the measurement time of the load statistics of this visited cell. If the measurement time is no earlier than the time stamp provided in the UELoadReportRequest, meaning that the measurement was not outdated, the load statistics of that cell is pushed in a container (set), S16. When all cells in the visited cell list are checked, S18, the UE select up to MaxNumOfCells cell load statistics and sends via the UELoadReport, S19.

Figure 6:
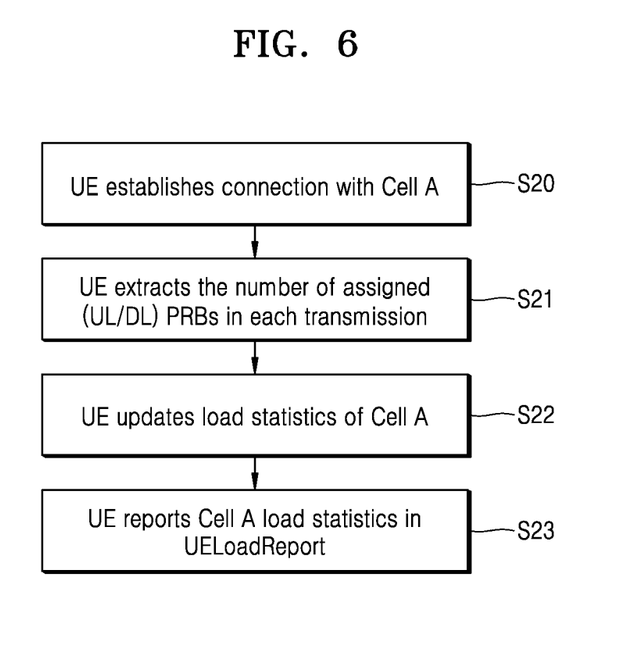
FIG. 6 shows a method according to an embodiment of the present disclosure.

FIG. 6 shows a procedure for collecting cell radio load statistics. UE 10 maintains two counters for each visited cell, counting the number of assigned uplink and downlink physical resource blocks (PRBs) when it is active in a cell. The UE 10 also keeps time stamps recording when each cell load statistic is collected. In order to compute load statistics, a buffer is required in the UE to store counters over a period of time.

First, the UE 10 establishes connection to a cell, e.g., Cell A, S20. Then, the UE 10 will extract, S21, its number of uplink and downlink assigned PRBs in each physical downlink control channel (PDCCH) transmission and add these numbers to its history buffer. Next, the UE 10 load statistics can be calculated, S22, using a sliding observation interval, averaging the counters stored in the buffer. In each calculation, the time stamp is updated to the current time. Finally, when the UE 10 receives the UE load report request, the UE 10 sends, S23, the statistics and time records via the UELoadReport S2.

Figure 7:
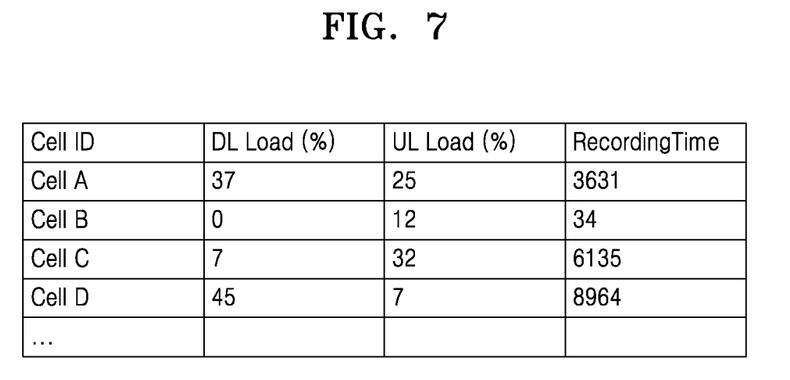
FIG. 7 shows a sample report associated with an embodiment of the present disclosure.

FIG. 7 shows an example of UELoadReport with Timestamp=10000 (time difference) in the UELoadReportRequest. In a UELoadReport, there are four types of entries, Cell ID, DL load, UL load, and record time. Cell ID represents the cell id of the cells to which the UE 10 has been previously connected. DL and UL loads are the loads that the UE 10 imposed on these cells. Recording time is the time instance when the statistics were gathered. The recording time may be in the form of a time difference or a universal time stamp. In this case, the serving cell 20 is requesting UE loads on previously visited cells with statistics collected no earlier than 10000 seconds ago.

Figure 8:
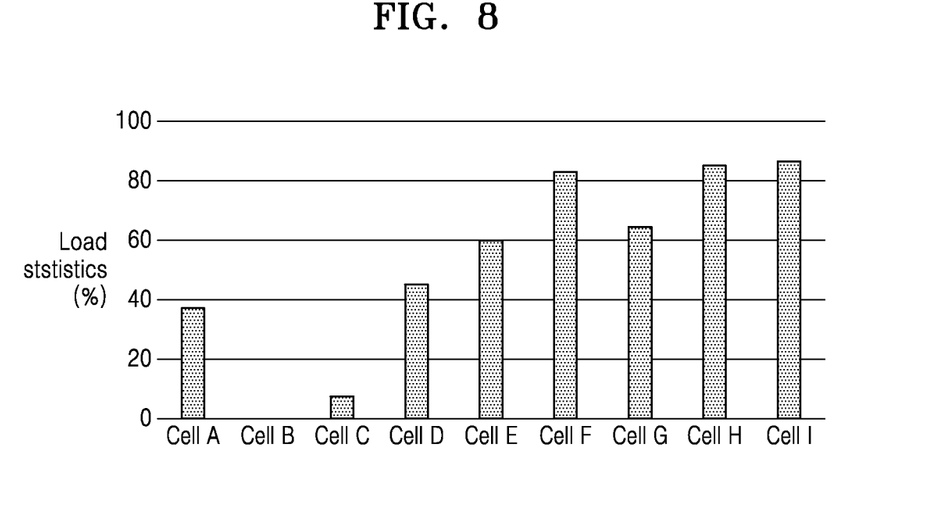
FIG. 8 shows sample statistics associated with an embodiment of the present disclosure.

FIG. 8 shows the DL loads of visited cells that are also in the UELoadReportRequest. This is essentially a graphical representation of the information shown in FIG. 7, supplemented with DL loads for additional cells Cell E to Cell I.

Figure 9:
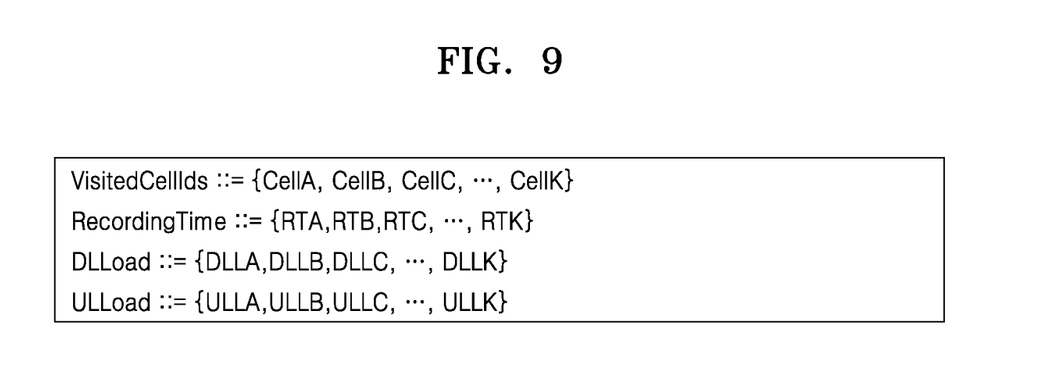
FIG. 9 shows an example load report associated with an embodiment of the present disclosure.

FIG. 9 shows how entries may be assigned in the UELoadReport.

Figure 10:
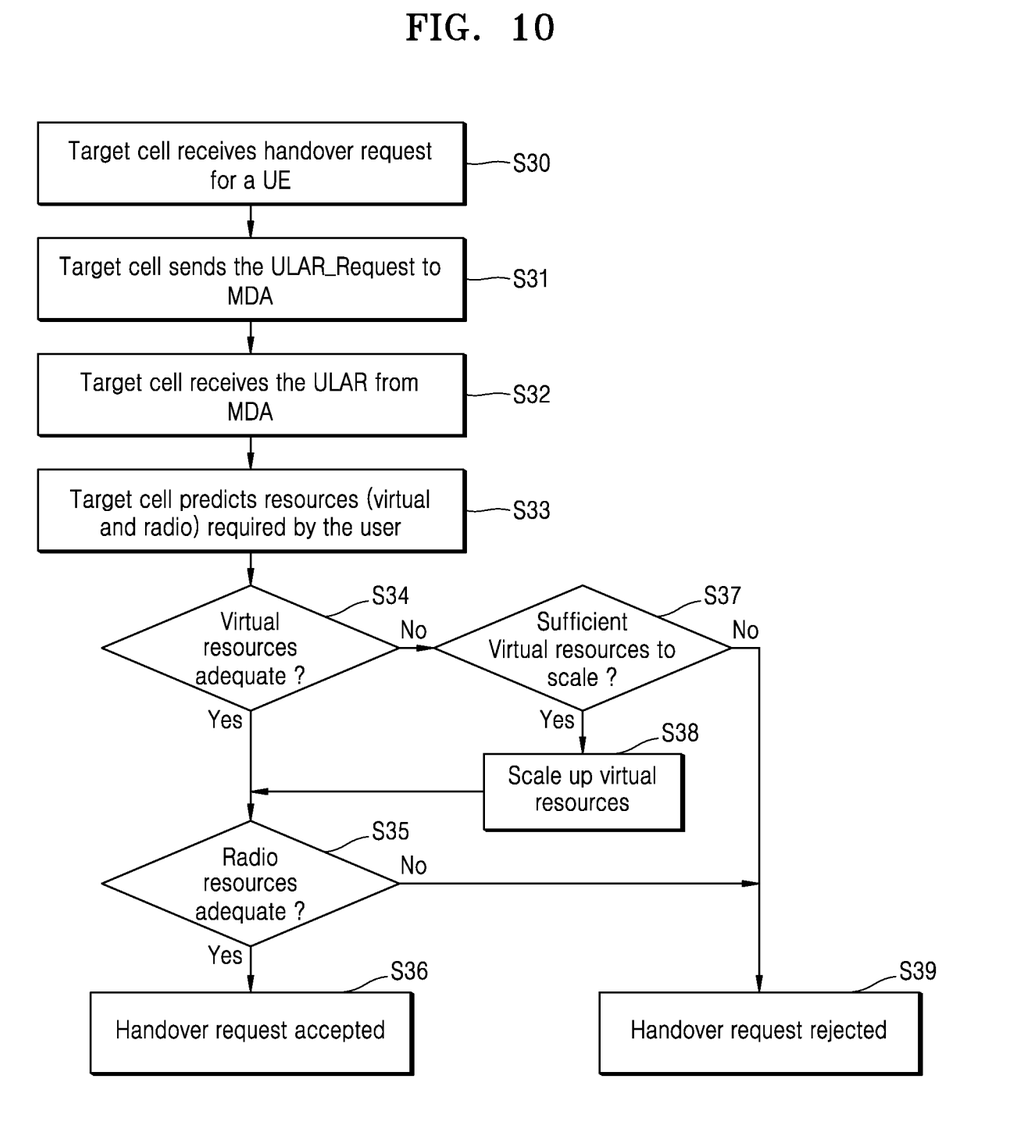
FIG. 10 shows a method according to an embodiment of the present disclosure.

FIG. 10 shows a procedure for the target cell handling a handover request. The target cell 30 receiving, S30, a handover request will request a ULAR (UE Load Analytical Report) for the migrating UE 10. The ULAR will provide predictions for the additional radio and virtual resource requirements for the UE on the target cell in the near future. The target cell will use the ULAR to decide whether to accept or reject the UE handover.

In more detail, the target cell 30 sends the ULAR Request to the MDA, S31. The MDA responds and sends the ULAR to the target cell, S32. In response, the target cell predicts resourced (virtual and radio) required, S33.

If the virtual resources, S34, and radio resources, S35, are adequate, then the handover request is accepted, S36.

If the virtual resources are not adequate, S34, but can be scaled up, S37, then they are scaled, S38, and the handover request is accepted, S35, provided there are adequate radio resources, S35.

If the virtual resources (virtual and radio) are not adequate and cannot be scaled, then the handover request is rejected, S39.

The MDAS producer (shown in FIG. 1) will periodically collect UE Load statistics from source gNBs. Data collected over a period of time is analysed to predict aggregated UE resource requirements on the target gNB. MDAS can utilize historical data and AI/ML (for example, time series based) algorithm to predict UE requirements of the gNB. The target cell uses the same to decide whether to accept or reject the UE handover, as shown in FIG. 10.

The following table shows the data collected from gNB:

| Data Category | Required Data |
| --- | --- |
| UE Load Statistics | UE Identifier: Anonymous id e.g C-RNTI<br>Cell ID: Cell ID represents the cell id of the cells to which the UE (identified by anonymous id e.g. C-RNTI) has been previously connected<br>DL load: DL loads are the loads that the UE imposed on previously connected cells. These loads are represented by the number of assigned DL PRBs, DL traffic volume and the amount of virtual resource consumed within the collection period.<br>UL load: UL loads are the loads that the UE imposed on previously connected cells. These loads are represented by the number of assigned UL PRBs, UL traffic volume and the amount of virtual resource consumed within the collection period.<br>Load on virtual processors: Virtual processor (CPU) usage for the UE<br>Load on memory: Virtual memory usage for the UE<br>Load on storage: Virtual storage usage for the UE<br>Record time: Recording time is the time instance when the statistics were gathered<br>Collection Period: elapsed time for which the statistic are collected. e.g. last 10000 seconds. |

The following table shows the analytics information provided in the ULAR:

| | Attribute Name | Description |
| --- | --- | --- |
| UE Load Analytical Report | UE Identifier<br>Projected UE virtual resource requirements | Anonymous id e.g. C-RNTI<br>Projected requirement for virtual processor usage for the UE.<br>Projected requirement for virtual memory usage for the UE.<br>Projected requirement for virtual storage usage for the UE. |
| | Projected UE radio resource requirements | Projected number of required DL and UL PRBs, DL and UL traffic volumes within the collection period. |
| | Projection Time | The future timestamp to which the projections applies. |
| | Collection Period | Elapsed time for which the statistic are collected for the projection. E.g. last 10000 seconds. |

"Minimization of Drive Tests" is a feature of telecommunication networks, whereby nodes are able to report certain network parameters instead of a manual process where a car is physically driven around the network to make measurements. The 3GPP MDT feature enables the O&M to collect measurement, such as radio measurement, resource measurement, location information, from the UE. The MDT mechanism may serve as the information conveyor for ULAR measurement and reporting. The radio access network (RAN) sends the enhanced collected measurement report to the trace collection entity (TCE).

Figure 11:
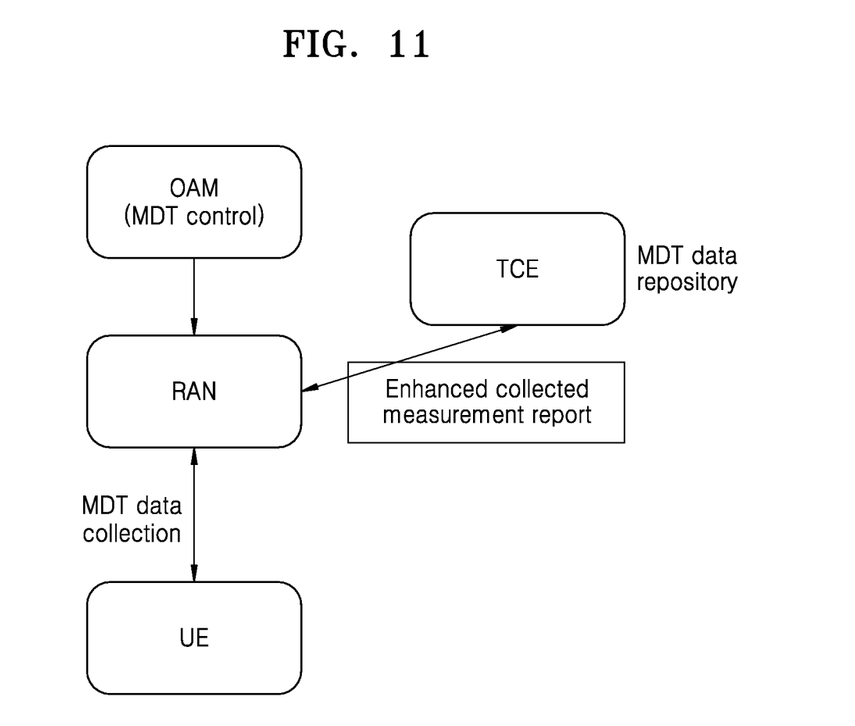
FIG. 11 shows a representation of enhanced measurement reporting according to an embodiment of the present disclosure.

The enhanced collected measurement data include legacy measurements and proposed extended measurements on virtual resource loads. UEs can be configured to measure loads in radio resources. After receiving UEs' radio loads, the RAN will additionally embed virtual resource usage information (virtual processor, memory, storage) into the enhanced collected measurement report. This is illustrated in FIG. 11, which highlights the enhanced collection measurement report referred to above.

The enhanced collected measurement report can be formed by extending legacy measurement parameters by adding enhanced measurement parameters, such as those listed below:

| Measurements | Legacy | Enhanced |
| --- | --- | --- |
| M1: DL signal quantities measurement results for the serving cell and for intra-frequency/Inter-frequency/inter-RAT neighbour cells, including cell/beam level measurement | ✓ | |
| M2: Power headroom (PH) measurement by UE | ✓ | |
| M3 is not supported by this release | ✓ | |
| M4: Data volume measurement separately for DL and UL | ✓ | |
| M5: Average UE throughput measurement separately for DL and UL | ✓ | |
| M6: Packet delay measurement, separately for DL and UL | ✓ | |
| M7: Packet loss rate measurement, separately for DL and UL | ✓ | |
| M8: RSSI measurement by UE for WLAN and Bluetooth ® | ✓ | |
| M9: RTT measurement by UE for WLAN | ✓ | |
| M10: Radio load measurement separately for DL and UL | | ✓ |
| M11: Virtual processor load measurement for the UE | | ✓ |
| M12: Memory usage measurement for the UE | | ✓ |
| M13: Storage usage measurement for the UE | | ✓ |

Those above marked "legacy" are known in the prior art and those marked "enhanced" are associated with an embodiment of the present disclosure.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of the foregoing embodiment(s). The disclosure extends to any novel one, or any novel combination, of the features disclosed in this specification (including any accompanying claims, abstract and drawings), or to any novel one, or any novel combination, of the steps of any method or process so disclosed.

What is claimed is:

1. A method, performed by a serving cell, of operating a wireless communication network comprising the steps of:
    transmitting a request message to a user equipment (UE);
    receiving, from the UE, information related to a load that it imposes on a visited cell, wherein the load comprises a radio resource load and a virtual resource load, in response to the request message;
    transmitting a handover request to a target cell;
    receiving, from the target cell, a message indicating that the handover request is accepted or rejected, wherein whether the handover request is accepted or rejected is determined based on a load analytic report; and
    forwarding the information to a Management Data Analytics (MDA) module,
    wherein the load analytic report is requested by the target cell to the MDA module and the MDA module responds with the load analytic report,
    wherein the load analytic report is conveyed by way of a Minimisation of Drive Tests (MDT) mechanism, and
    wherein the load analytic report is further conveyed to a Trace Collection Entity (TCE) by a Radio Access Network which is in communication with the UE.

2. The method of claim 1 wherein the information related to the radio resource load comprises a number of assigned Physical Resource Blocks (PRB) in each transmission.

3. The method of claim 1 wherein the virtual resource load comprises one or more of virtual processor (CPU) usage and virtual memory usage.

4. The method of claim 2 wherein the information is associated with a time stamp.

5. The method of claim 1, wherein the target cell determines if the virtual resources may be scaled to meet a UE requirement.

6. A serving cell comprising:
    a transceiver; and
    a processor and configured to:
        transmit a request message to a user equipment (UE),
        receive, from the UE, in response to the request message, information related to a radio resource load and a virtual resource load that the UE imposes on a visited cell,
        transmit a handover request to a target cell,
        receive, from the target cell, a message indicating that the handover request is accepted or rejected, wherein whether the handover request is accepted or rejected is determined based on a UE load analytical report (ULAR), and
        forward the information to a Management Data Analytics (MDA) module,
    wherein the ULAR is requested by the target cell to the MDA module and the MDA module responds with the ULAR,
    wherein the ULAR is conveyed by way of a Minimisation of Drive Tests (MDT) mechanism, and
    wherein the ULAR is further conveyed to a Trace Collection Entity (TCE) by a Radio Access Network which is in communication with the UE.

7. The serving cell of claim 6, wherein the information related to the radio resource load comprises a number of assigned Physical Resource Blocks (PRB) in each transmission.

8. The serving cell of claim 6, wherein the virtual resource load comprises one or more of virtual processor (CPU) usage and virtual memory usage.

9. The serving cell of claim 6, wherein the information is associated with a time stamp.

10. The serving cell of claim 6, wherein the target cell determines if the virtual resources may be scaled to meet a UE requirement.

* * * * *